US010611101B2

(12) United States Patent
Huddleston et al.

(10) Patent No.: US 10,611,101 B2
(45) Date of Patent: *Apr. 7, 2020

(54) MANDREL FORMING FOR DISCRETE WING SKIN STIFFENERS

(71) Applicant: Lockheed Martin Corporation, Bethesda, MD (US)

(72) Inventors: Nicholas Lee Huddleston, Marietta, GA (US); Jaime Ballester, Newhall, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 277 days.

This patent is subject to a terminal disclaimer.

(21) Appl. No.: 15/644,906

(22) Filed: Jul. 10, 2017

(65) Prior Publication Data

US 2017/0305080 A1 Oct. 26, 2017

Related U.S. Application Data

(62) Division of application No. 14/534,747, filed on Nov. 6, 2014, now Pat. No. 9,701,070.

(51) Int. Cl.
| | |
|---|---|
| *B29C 70/70* | (2006.01) |
| *B29C 70/44* | (2006.01) |
| *B64F 5/10* | (2017.01) |
| *B29L 31/30* | (2006.01) |
| *B29K 683/00* | (2006.01) |
| *B29K 309/08* | (2006.01) |
| *B29L 31/00* | (2006.01) |
| *B29K 663/00* | (2006.01) |

(52) U.S. Cl.
CPC ............ *B29C 70/70* (2013.01); *B29C 70/443* (2013.01); *B64F 5/10* (2017.01); *B29K 2309/08* (2013.01); *B29K 2663/00* (2013.01); *B29K 2683/00* (2013.01); *B29L 2031/001* (2013.01); *B29L 2031/3085* (2013.01); *Y02T 50/43* (2013.01)

(58) Field of Classification Search
None
See application file for complete search history.

(56) References Cited

U.S. PATENT DOCUMENTS

| | | | |
|---|---|---|---|
| 3,795,559 A | 3/1974 | Horn et al. | |
| 4,853,172 A | 8/1989 | Jacaruso | |
| 5,368,807 A | 11/1994 | Lindsay | |
| 5,538,589 A | 7/1996 | Jensen | |
| 5,593,633 A | 1/1997 | Dull | |
| 6,159,414 A * | 12/2000 | Tunis, III | B29C 43/021 264/510 |

(Continued)

*Primary Examiner* — Monica A Huson
(74) *Attorney, Agent, or Firm* — Baker Botts L.L.P.

(57) ABSTRACT

In one embodiment, a stiffener may be formed by inserting a plurality of flexible mandrels into a channel of a tool having a three-dimensional contour, placing a vacuum bag over the flexible mandrels and the tool, with the mandrels disposed between the vacuum bag and the tool, and applying vacuum pressure between the vacuum bag and the tool. A hardening substance may be inserted into each of the plurality of flexible mandrels and then may be hardened while the plurality of mandrels are inserted in the one or more channels of the tool. Finally, the mandrels may be wrapped with a stiffener material with stiffeners being formed from the stiffener material.

20 Claims, 8 Drawing Sheets

(56) References Cited

U.S. PATENT DOCUMENTS

| | | |
|---|---|---|
| 6,565,351 B2 | 5/2003 | Holsinger |
| 6,632,502 B1 | 10/2003 | Allen |
| 7,074,474 B2 | 7/2006 | Toi |
| 7,216,832 B2 | 5/2007 | Simpson |
| 7,897,004 B2 | 3/2011 | Engwall |
| 7,901,531 B2 | 3/2011 | Pham |
| 8,377,248 B2 | 2/2013 | Coleman |
| 8,419,402 B2 | 4/2013 | Guzman |
| 8,574,391 B2 | 11/2013 | Sander |
| 8,617,687 B2 | 12/2013 | McCarville |
| 8,663,526 B2 | 3/2014 | Duqueine |
| 9,701,070 B2 * | 7/2017 | Huddleston ........... B29C 70/443 |
| 2011/0076461 A1 | 3/2011 | Torben et al. |
| 2013/0340944 A1 | 12/2013 | Modin |
| 2016/0129989 A1 | 5/2016 | Huddleston |

* cited by examiner

MANDREL FORMING FOR DISCRETE WING SKIN STIFFENERS

RELATED APPLICATION

This application is a divisional application of U.S. application Ser. No. 14/534,747 filed Nov. 6, 2014 and entitled "Mandrel Forming for Discrete Wing Skin Stiffeners."

TECHNICAL FIELD

This disclosure generally relates to mandrel forming and more specifically to a method for forming mandrels for use in generating discrete stiffeners for three-dimensional panels.

BACKGROUND

Large panels for use with vehicles such as aircraft or watercraft my be reinforced using stiffeners such as Z-, C-, I-, J-, hat, or blade stiffeners in order to hold their shape under the various loads presented to them during operation. These panels may comprise three-dimensional contours to which the stiffeners must be coupled. Current methods of making tooling (e.g., mandrels) for use in generating stiffeners for coupling to three-dimensional contours are not well adapted to form the stiffeners into discrete, complex three-dimensional shapes needed for use with the vehicle panels (e.g., large aircraft wing skins) as the tooling has typically been formed of metal or other stiff materials, making the tooling difficult to create or use (and even impossible to use in the case of certain stiffeners).

SUMMARY OF PARTICULAR EMBODIMENTS

According to one embodiment, a stiffener may be formed by inserting a plurality of flexible mandrels into a channel of a tool having a three-dimensional contour, placing a vacuum bag over the flexible mandrels and the tool, with the mandrels disposed between the vacuum bag and the tool, and applying vacuum pressure between the vacuum bag and the tool. A hardening substance may be inserted into each of the plurality of flexible mandrels and then may be hardened while the plurality of mandrels are inserted in the one or more channels of the tool. Finally, the mandrels may be wrapped with a stiffener material with stiffeners being formed from the stiffener material.

Technical advantages of certain embodiments may include methods for providing mandrels that are better suited to create stiffeners in the discrete three-dimensional shapes needed for use as aircraft wing stiffeners. Some embodiments may provide methods for creating mandrels for use in forming I, J, and/or blade stiffeners. Some embodiments may provide a method that is more cost effective for forming mandrels for use in shaping aircraft wing stiffeners. Other technical advantages will be readily apparent to one skilled in the art from the following figures, descriptions, and claims. Moreover, while specific advantages have been enumerated above, various embodiments may include all, some, or none of the enumerated advantages.

DESCRIPTION OF EXAMPLE EMBODIMENTS

Large panels for use with vehicles such as aircraft or watercraft my be reinforced using stiffeners such as Z-, C-, I-, J-, hat, or blade stiffeners in order to hold their shape under the various loads presented to them during operation. These panels may comprise three-dimensional contours to which the stiffeners must be coupled. Current methods of making tooling (e.g., mandrels) for use in generating stiffeners for coupling to three-dimensional contours are not well adapted to form the stiffeners into discrete, complex three-dimensional shapes needed for use with the vehicle panels (e.g., large aircraft wing skins) as the tooling has typically been formed of metal or other stiff materials, making the tooling difficult to create or use (and even impossible to use in the case of certain stiffeners). These difficulties may be due to the inflexible nature of the stiff materials used, which may cause issues in tolerance and/or yield during manufacturing. Because of these issues, tooling composed of stiff materials such as metal has been expensive to manufacture. In some instances, the use of incomplete and/or less than optimal stiffeners has been required. For example, due to the above mentioned difficulties in creating tooling used to generate three-dimensionally shaped stiffeners, the stiffeners created for aircraft wing skins have typically been used on the flat, straight sections of the wing skin rather than the three-dimensionally contoured sections of the wing skin.

Accordingly, the teachings of the present disclosure include a novel, low-cost method of forming tooling (e.g., mandrels) for use in generating three-dimensionally contoured stiffeners. The tooling created according to the teachings of the present disclosure may be used in shaping any suitable type of stiffener for a three-dimensionally shaped panel, including I-, J-, and blade stiffeners for use with a three-dimensionally contoured aircraft wing skin. As an example and not by way of limitation, an inexpensive material such as foam may be used to create a mold in the shape of the three-dimensional wing skin, with channels formed where stiffeners are desired. A pair of flexible mandrels (e.g., made of silicone rubber) may then be laid into the channels side by side, with a vacuum bag placed over the mandrels to hold the them in place. The mandrels may then be stiffened into shape through any suitable hardening process, such as by injecting a hardening substance (e.g., fiberglass resin) into the centers of the mandrels. Once the substance has solidified, holding the flexible mandrels in the desired shape, the mandrels can then be wrapped with a stiffener material (e.g., carbon composite) to make the wing skin stiffeners. Once formed, the stiffeners can then be attached, to the wing skin.

To facilitate a better understanding of the present disclosure, the following examples of certain embodiments are given. In no way should the following examples be read to limit, or define, the scope of the disclosure. Embodiments of the present disclosure and its advantages are best understood by referring to FIGS. 1 through 5, where like numbers are used to indicate like and corresponding parts.

Figure 1A:
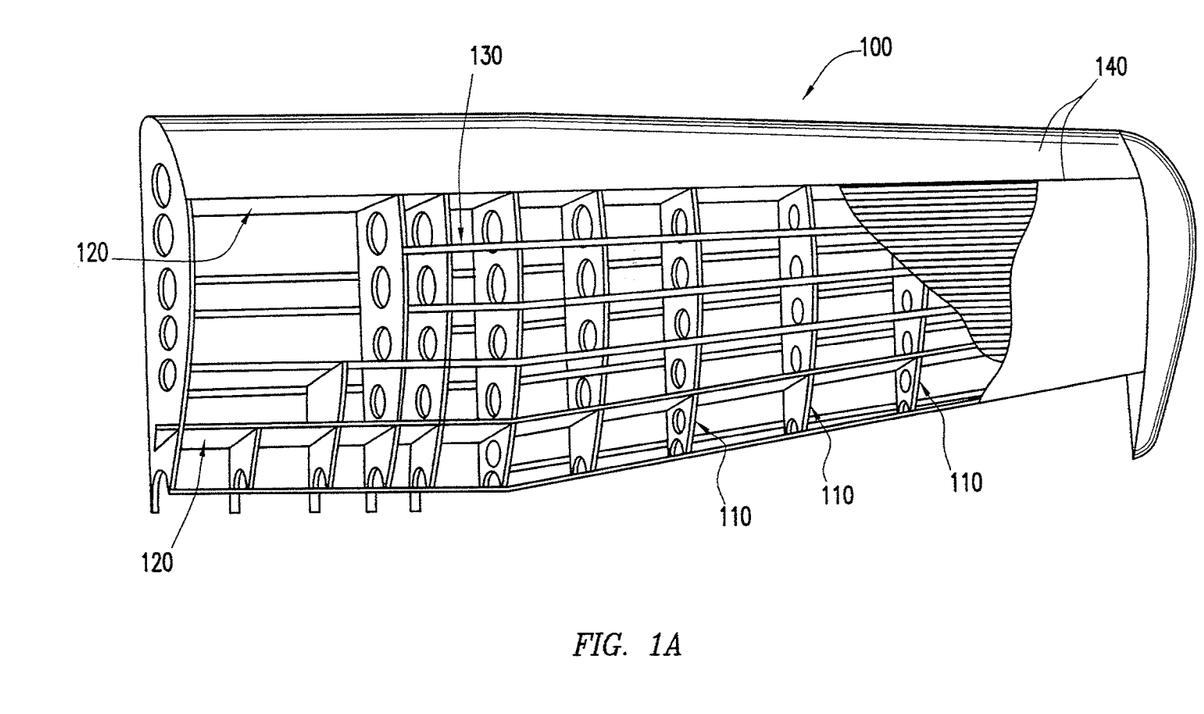
FIG. 1A illustrates an example aircraft wing, according to certain embodiments.
Figure 1B:
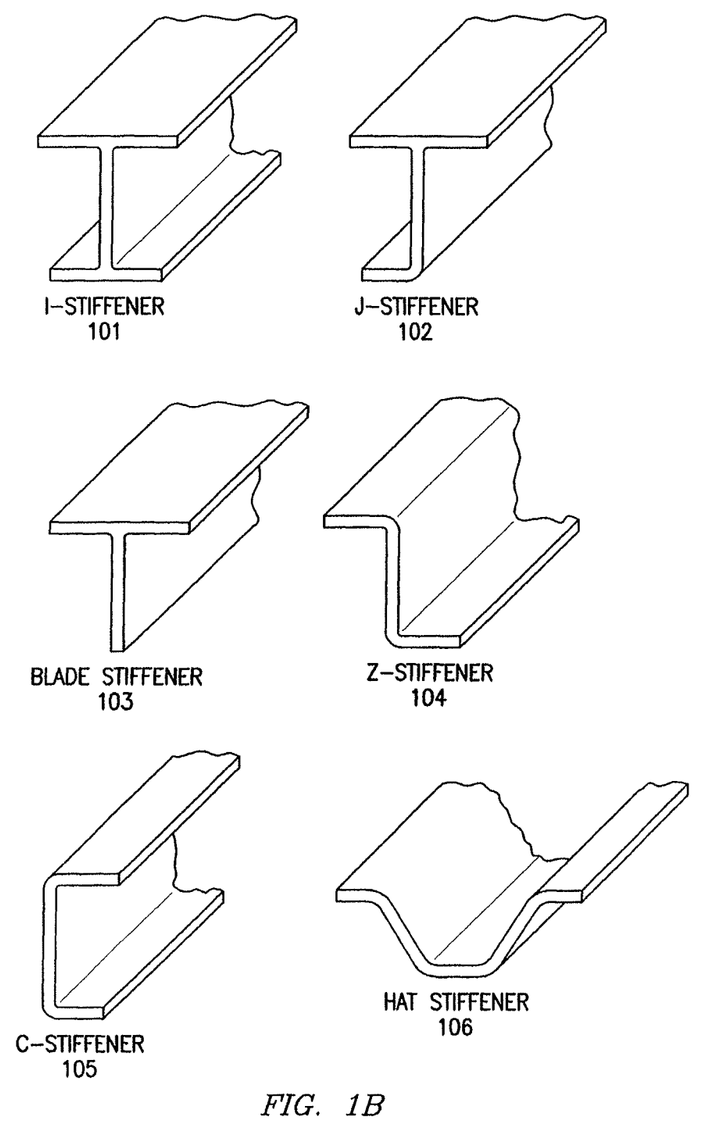
FIG. 1B illustrates example stiffeners that may be used as vertical stiffeners and/or horizontal stiffeners in the aircraft wing of FIG. 1A, according to certain embodiments.

FIG. 1A illustrates an example aircraft wing 100, according to certain embodiments. Aircraft wing 100 may include a skeleton that forms the structural base of the aircraft wing. It may be comprised of vertical stiffeners 110 and/or horizontal stiffeners 120. FIG. 1B illustrates example stiffeners 101-106 that may be used as vertical stiffeners 110 and/or horizontal stiffeners 120 in aircraft wing 100 of FIG. 1A, according to certain embodiments. Vertical stiffeners 110 may be referred to as "ribs" and horizontal stiffeners 120 may be referred to as "spars," in some embodiments. Stiffeners 110 and/or 120 may include any suitable stiffener for use with an aircraft wing, such as an I-beam, J-beam, or blade stiffener. Furthermore, stiffeners 110 and/or 120 may be composed of any suitable material for use in aerospace applications, such as steel, aluminum, or carbon composite. In certain embodiments, the skeleton may further comprise stringers 130 running parallel with vertical stiffeners 110 and/or through horizontal stiffeners 120. Once the skeleton of the wing is formed, skin 140 may be attached thereto. Skin 140 may be composed of any suitable material for use in aerospace applications, such as aluminum or carbon composite. Skin 140 may provide the surface over which air flows, producing the lift forces necessary for flight.

Modifications, additions, or omissions may be made to FIGS. 1A-1B without departing from the scope of the present disclosure. For example, although FIG. 1A illustrates stiffeners in aircraft wings, it will be understood that aspects of the present disclosure may be applied to any other suitable stiffeners for three-dimensionally contoured panels, such as those associated with motor vehicles or watercraft. Furthermore, the stiffeners illustrated in FIG. 1B are merely example stiffeners, and should not be understood to limit the present disclosure. For example, slight design changes to the stiffeners 101-106 of FIG. 1B (e.g., angles of bends in the stiffener) may be made without departing from the teachings of the present disclosure. Moreover, it will be understood that other stiffener designs not expressly illustrated may be created using tooling formed according to the teachings of the present disclosure.

Figure 2A:
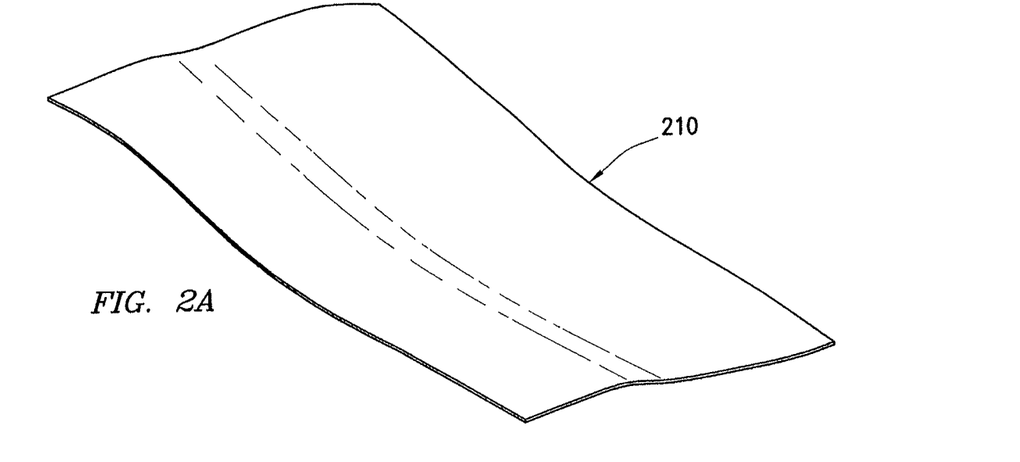
FIGS. 2A-2D illustrate an example method of forming flexible mandrels into discrete three-dimensional shapes, according to certain embodiments.
Figure 2B:
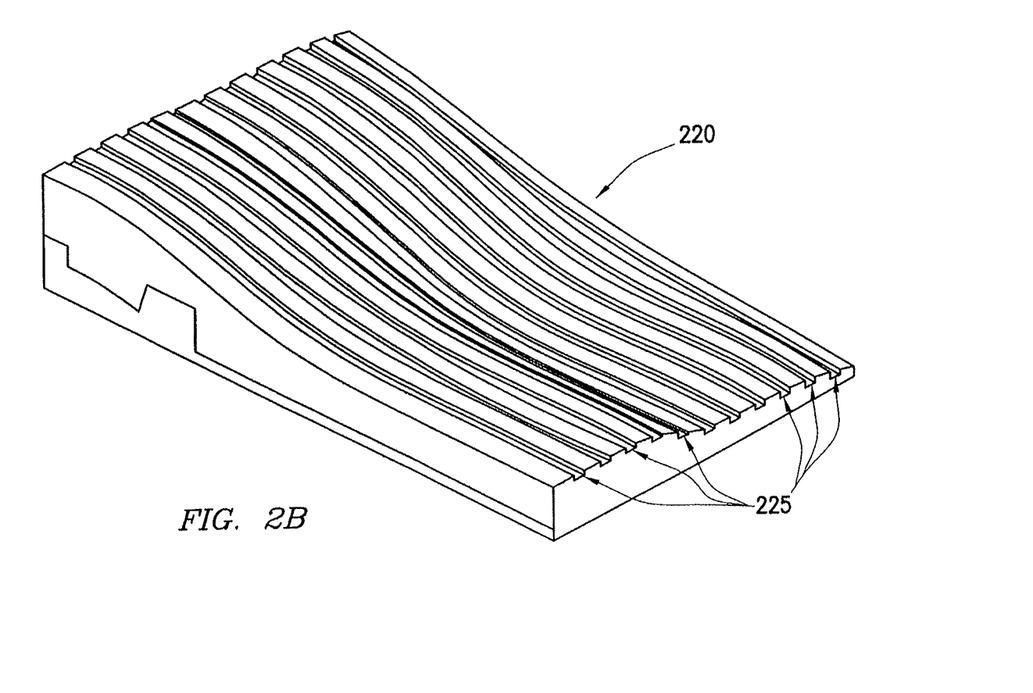

FIGS. 2A-2D illustrate an example method of forming flexible mandrels into discrete three-dimensional shapes, according to certain embodiments. Panel 210 includes a three-dimensional contour, and may be any suitable panel to which stiffeners may be coupled. For example, in some embodiments, panel 210 may be a wing skin for an aircraft wing such as aircraft wing 100 of FIG. 1A. Using panel 210 shown in FIG. 2A, a tool 220 having a three-dimensional contour may be created that includes one or more channels 225, as shown in FIG. 2B. The three-dimensional contour of tool 220 follows the contour of panel 210, and it will be understood that tool 220 may be made through any suitable process. For example, measurements or any other suitable form of analysis of panel 210 may be performed such that the three-dimensional contour of panel 210 may be reproduced onto tool 220. As another example, tool 220 may be formed using a computer aided drawing (CAD) file that was used to create panel 210. Tool 220 may be composed of any suitable material that may be used for forming a three-dimensional contour from an existing shape. In some embodiments, tool 220 may be composed of an inexpensive material, such as foam or plastic, as opposed to more typical and expensive materials, such as steel. In some embodiments, channels 225 may be formed into the three-dimensional contour of tool 220 after the creation of tool 220, while in other embodiments, channels 225 may be formed into the three-dimensional contour of tool 220 as tool 220 is being formed.

Figure 2C:
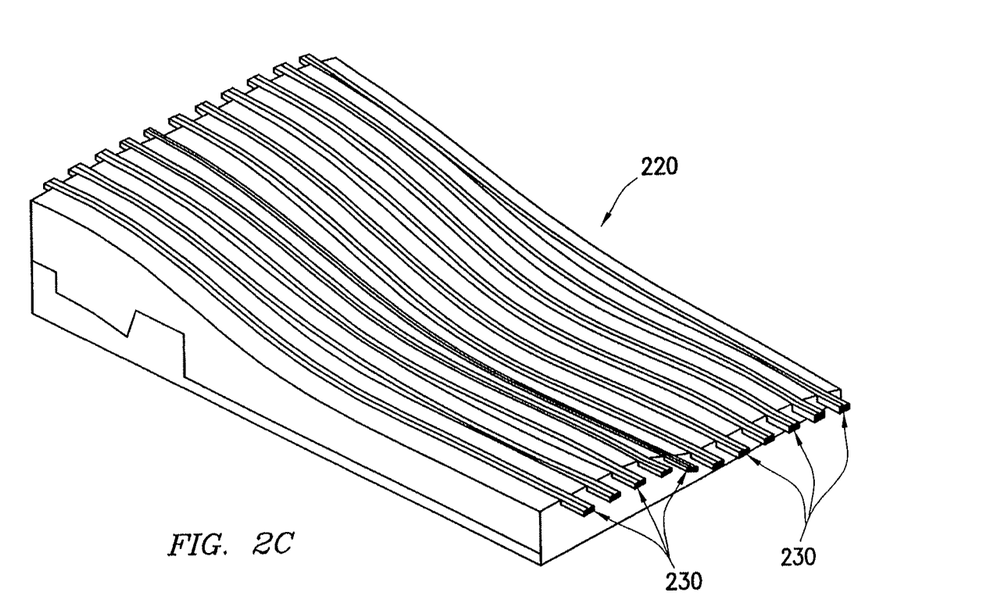

Next, one or more flexible mandrels may be inserted into channels 225 of tool 220. The number of flexible mandrels 230 inserted into channels 225 may be determined according to any suitable criteria, and in some embodiments may be based on the type of stiffener to be created. As an example, and as shown in FIG. 2C, a pair of flexible mandrels 230 may be inserted into each of channels 225 of tool 220 in order to create I-stiffeners. As another example, one flexible mandrel 230 may be inserted into each of channels 225 in order to create C-stiffeners. As yet another example, three flexible mandrels 230 may be inserted into each of channels 225 in order to create hat stiffeners. It will be understood, however, that any suitable number of flexible mandrels 230 may be inserted into channels 225 of tool 220 in order to create particular stiffener shapes.

Figure 2D:
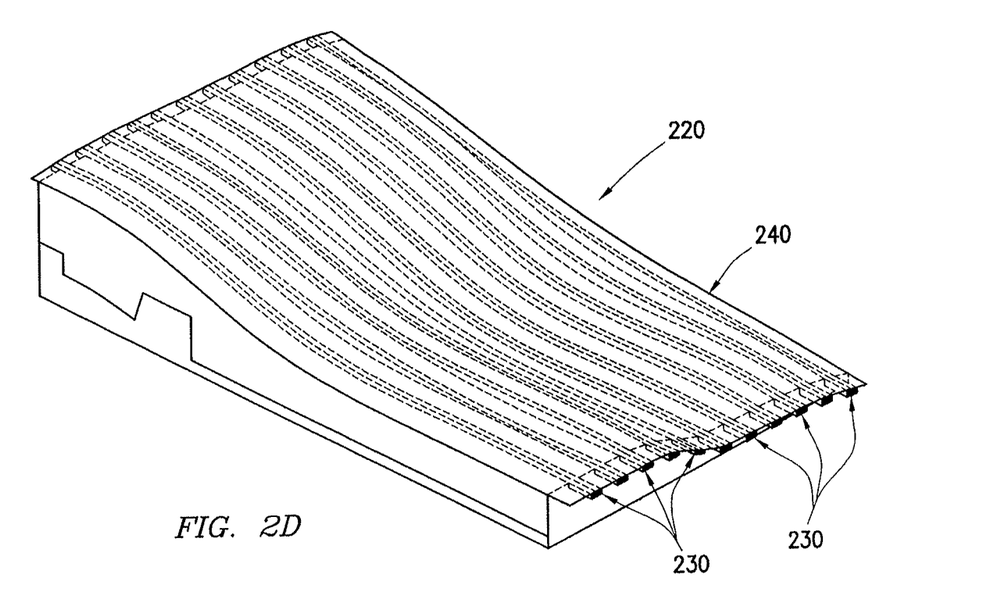

Once inserted into channels 225, mandrels 230 may be secured into their respective places in tool 220 by a vacuum bag 240, as shown in FIG. 2D. In certain embodiments, a breather cloth (not shown) may be placed between mandrels 230 and vacuum bag 240. Using vacuum bag 240, air between tool 220, mandrels 230, and vacuum bag 240 may be removed, creating a secure fit of mandrels 230 in channels 225 and allowing for better shaping of mandrels 230. In some embodiments, mandrels 230 may be secured into place within tool 220 using adhesives or any other suitable means for coupling mandrels 230 to tool 220.

Modifications, additions, or omissions may be made to FIGS. 2A-2D without departing from the scope of the present disclosure. For example, tool 220 may be formed at the same time as panel 210 (e.g., using the same CAD file used to create panel 210). As another example, mandrels 230 may be formed using panel 210 itself rather than by creating a separate tool 220 with channels 225.

Figure 3A:
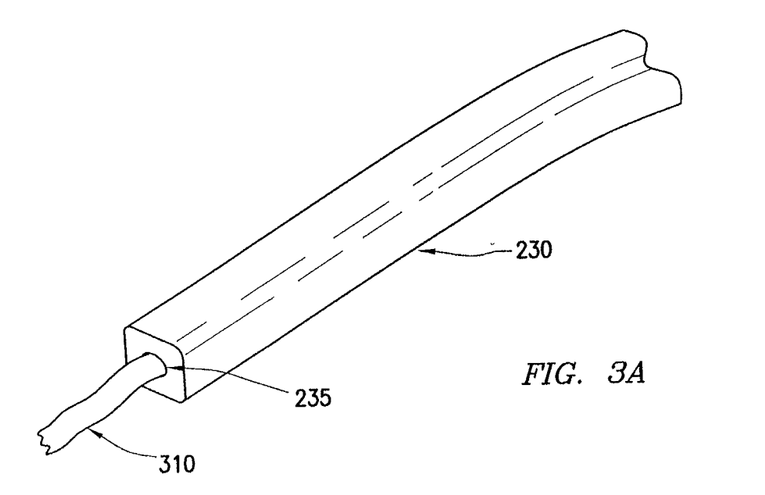
FIGS. 3A-3B illustrate an example method of hardening the flexible mandrels of FIGS. 2A-2D, according to certain embodiments.
Figure 3B:
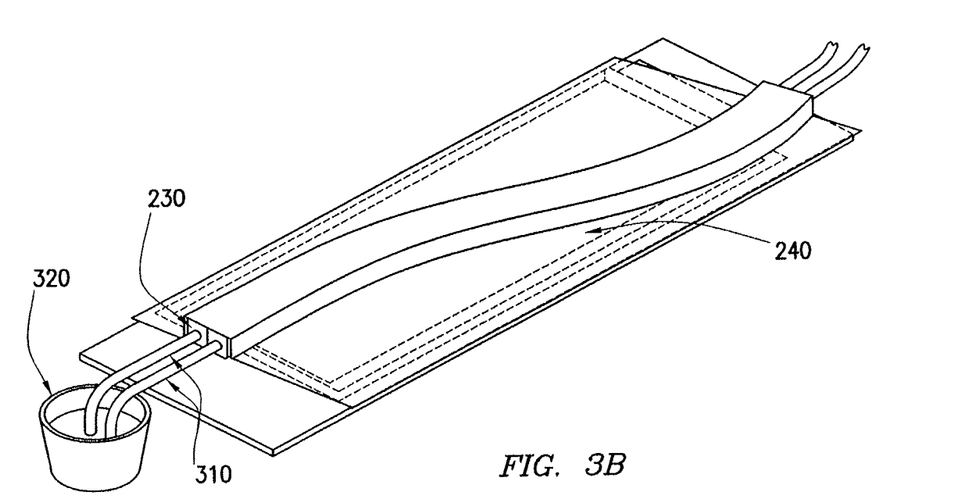

FIGS. 3A-3B illustrate an example method of hardening the flexible mandrels of FIGS. 2A-2D, according to certain embodiments. Once mandrels 230 have been shaped as desired, such as through the method of FIGS. 2A-2D, they may be hardened into the desired shape. This may be done using any suitable hardening process, and may be determined according to the material of which mandrels 230 are composed. For example, mandrels 230 may be composed of silicone rubber and may comprise a cavity 235 as shown in FIG. 3A into which tube 310 may be inserted. It will be understood that tube 310 may be inserted before or after the shaping of mandrels 230. In some embodiments, tube 310 may be composed of a flexible material. As an example, tube 310 may be a fiberglass rope in some embodiments.

Tube 310 may then be filled with a hardening agent in order to secure mandrels 230 into the desired shape. For example, a hardening resin may be inserted into tube 310 through a vacuum assisted resin transfer molding (VARTM) process. In such a process, as shown in FIG. 3B, resin 320 may be drawn into tubes 310 at one end of tubes 310 through the application of vacuum pressure at the opposite end of tubes 310. Once resin 320 is fully drawn into tubes 310, the resin may be hardened according to the necessary hardening process for the resin. For example, the resin may harden over time or may harden with application of heat. Once hardened, resin 320 may hold mandrels 230 into the desired shape.

Modifications, additions, or omissions may be made to FIGS. 3A-3B without departing from the scope of the present disclosure. For example, tube 310 may not be necessary for inserting a hardening agent, as the hardening agent may be inserted directly into cavity 235 in some embodiments. As another example, mandrels 230 may be composed of a material that hardens through a heating process, and that heating process may be used for hardening mandrels 230.

Figure 4A:
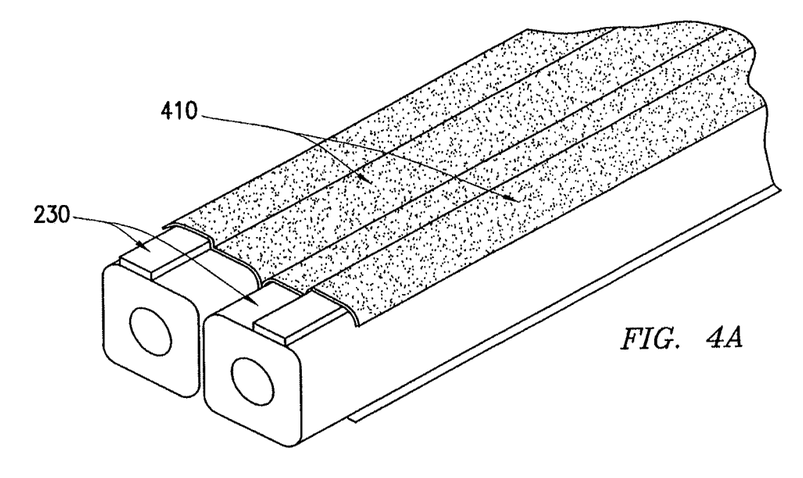
FIGS. 4A-4D illustrate an example method of forming stiffeners using the hardened flexible mandrels of FIGS. 3A-3B, according to certain embodiments.
Figure 4B:
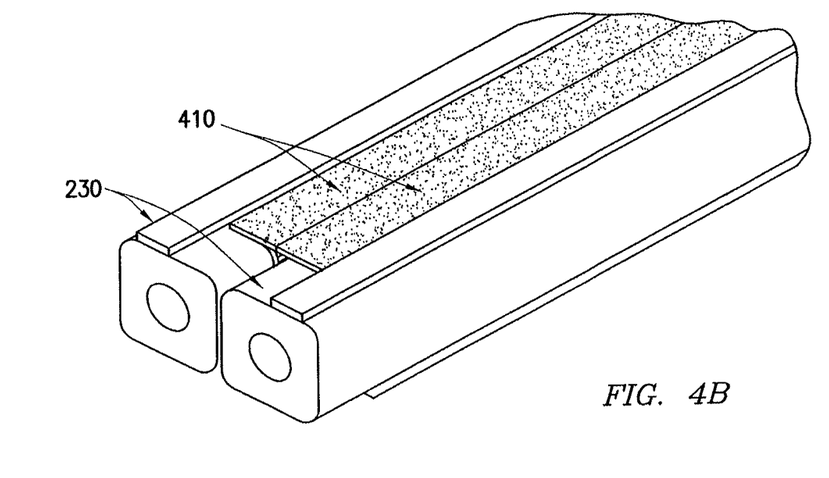

FIGS. 4A-4D illustrate an example method of forming stiffeners using the hardened flexible mandrels of FIGS. 3A-3B, according to certain embodiments. Once hardened, mandrels 230 may be used to form stiffeners, such as I-stiffeners, for coupling to a three-dimensionally contoured panel, such as an aircraft wing skin. In particular embodiments, mandrels 230 may be wrapped with a stiffener material 410 in order to create stiffeners 420. Stiffener material 410 may include any suitable material for creating stiffeners for coupling to a panel, and may include aluminum or carbon composite materials. Stiffener material 410 may be wrapped around mandrels 230 as necessary to create the desired form of stiffener. As an example, stiffener material 410 may be wrapped around each of two mandrels 230 as shown in FIG. 4A to create an I-stiffener. After wrapping, stiffener material 410 may then be folded over as shown in FIG. 4B and then hardened into the shape. The hardening process for stiffener material 410 may depend on the material chosen. For example, stiffener material 410 may require welding or some adhesion process in order to be formed into final shape, creating stiffeners 420.

Figure 4C:
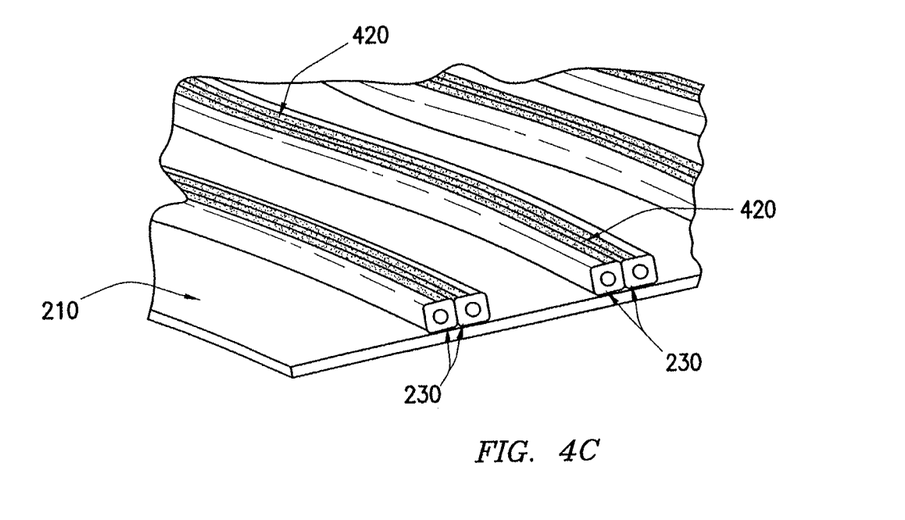
Figure 4D:
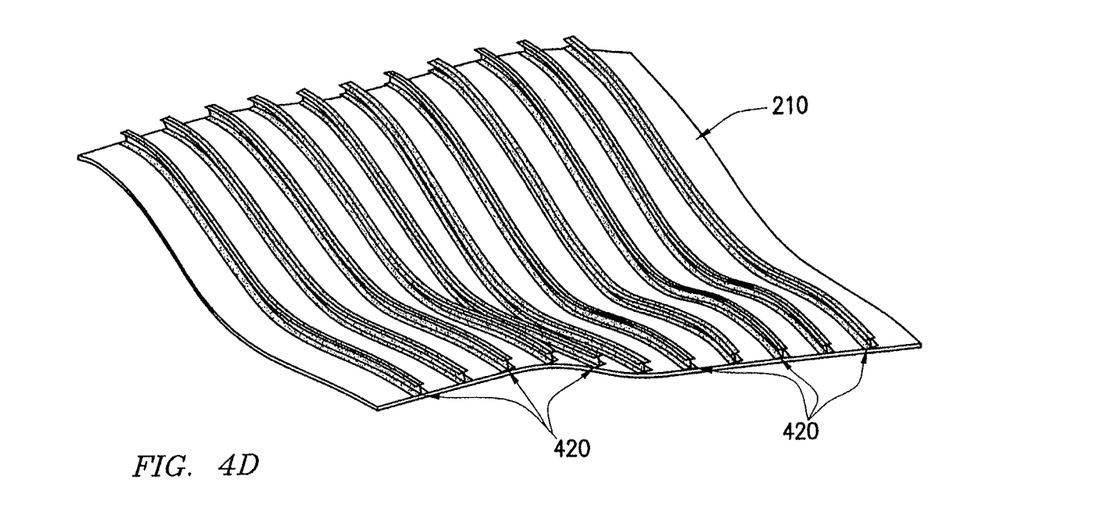

Stiffeners 420 may then be placed onto panel 210 for coupling. In some embodiments, this may be done with mandrels 230 still in place as shown in FIG. 4C. Stiffeners 420 may be coupled to panel 210 using any suitable coupling process. For example, stiffeners 420 may be welded into place on panel 210. As another example, stiffeners 420 may be adhered into place on panel 210 using epoxies. Mandrels 230 may then be removed, revealing a stiffened panel 210 as shown in FIG. 4D.

Modifications, additions, or omissions may be made to FIGS. 4A-4D without departing from the scope of the present disclosure. For example, depending on the stiffener shape chosen, mandrels 230 and stiffener material 410 may be placed onto panel 210 prior to shaping stiffener material 410 into shape. As another example, mandrels 230 may be removed from stiffeners 420 prior to or while coupling stiffeners 420 to panel 210.

Figure 5:
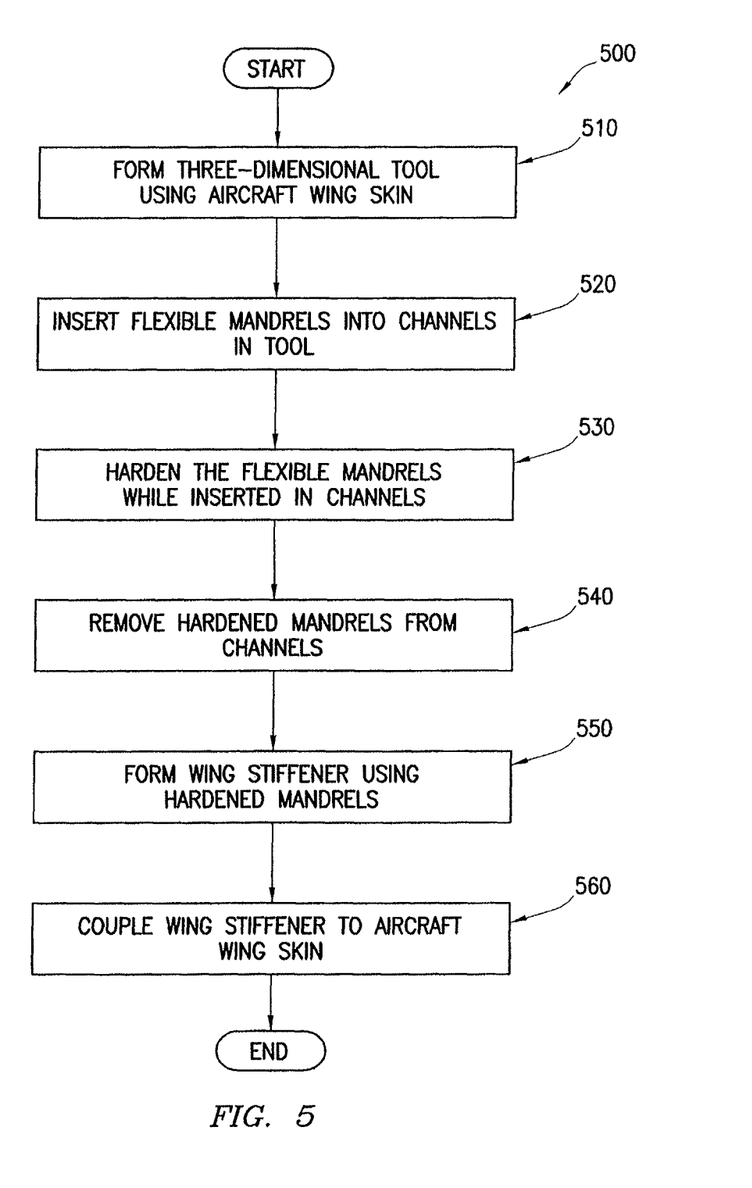
FIG. 5 illustrates an example method of forming wing skin stiffeners using flexible mandrels, according to certain embodiments.

FIG. 5 illustrates an example method 500 of forming wing skin stiffeners using flexible mandrels, according to certain embodiments. The method begins at step 510, where a tool having a three-dimensional contour is formed using an aircraft wing skin. The tool may be similar to tool 220 of FIGS. 2A-2D, and may be formed using any suitable process. For example, the tool may be formed using the CAD file used to create the wing skin. As another example, the tool may be formed by analyzing and measuring an already-manufactured wing skin. In this way, tolerance issues between mass-manufactured wing skins can be addressed. The tool may include channels in locations corresponding to locations on the wing skin chosen for stiffening. The channels may be formed into the tool during or after the creation of the tool.

Next, at step 520, flexible mandrels may be inserted into the channels of the tool associated with the wing skin. The mandrels may be secured into place within the channels using any suitable process, such as adhesion or vacuum processes. Once secured into place within the channels, the mandrels may be hardened at step 530. The hardening process may be chosen according to the type of mandrel material used. For example, if silicone rubber mandrels are used, a hardening resin may be inserted into the mandrels, as described above. As another example, the mandrels may be hardened through the use of a heating process if the mandrel material supports a heat-hardening process. Once hardened, the mandrels may be removed from the channels at step 540.

At step 550, the wing stiffener may be formed using the hardened mandrels. The details of this process may depend on the type of stiffener chosen. An example process is described above with respect to FIGS. 4A-4D for creating I-stiffeners. It will be understood that such a process may be modified in any suitable way in order to create other stiffener shapes, such as J-, Z-, C-, hat, or blade stiffeners. Once stiffeners are formed, they may be coupled to the wing skin at step 560. This may be done through any suitable coupling process, such as welding or adhesion techniques using of epoxies.

Modifications, additions, or omissions may be made to method 500 without departing from the scope of the present disclosure. For example, the order of the steps may be performed in a different manner than that described and some steps may be performed at the same time. Additionally, each individual step may include additional steps without departing from the scope of the present disclosure.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method of forming a stiffener, comprising:
    inserting one or more flexible mandrels into a channel of a tool having a three-dimensional contour;
    placing a vacuum bag over the one or more flexible mandrels and the tool, wherein the one or more flexible mandrels are disposed between the vacuum hag and the tool;
    applying vacuum pressure between the vacuum bag and the tool;

inserting a hardening substance into each of the one or more flexible mandrels;
creating one or more hardened mandrels by hardening the hardening substance while the one or more flexible mandrels are inserted in the one or more channels of the tool;
wrapping the one or more hardened mandrels at least partially with a material; and
forming the material into a stiffener.

2. The method of claim 1, wherein the stiffener comprises a shape selected from the group consisting of an I-stiffener, a J-stiffener, and a blade stiffener.

3. The method of claim 1, further comprising coupling the stiffener to a structure having a corresponding shape to the tool.

4. The method of claim 3, wherein the stiffener is coupled to the structure with the one or more hardened mandrels remaining in place within the stiffener.

5. The method of claim 1, further comprising placing a breathable material over the one or more flexible mandrels, wherein the breathable material is disposed between the one or more flexible mandrels and the vacuum bag.

6. The method of claim 1, wherein the material that is wrapped around at least part of the one or more hardened mandrels comprises aluminum or a carbon composite material.

7. A method of forming a stiffener, comprising:
inserting one or more flexible mandrels into a channel of a tool having a three-dimensional contour;
placing a vacuum bag over the one or more flexible mandrels and the tool, wherein the one or more flexible mandrels are disposed between the vacuum bag and the tool;
applying vacuum pressure between the vacuum bag and the tool;
creating one or more hardened mandrels by hardening the one or more flexible mandrels while the one or more flexible mandrels are inserted in the one or more channels of the tool;
wrapping the one or more hardened mandrels at least partially with a material; and
forming the material into a stiffener.

8. The method of claim 7, wherein the stiffener comprises a shape selected from the group consisting of an I-stiffener, a J-stiffener, and a blade stiffener.

9. The method of claim 7, further comprising coupling the stiffener to a structure having a corresponding shape to the tool.

10. The method of claim 9, wherein the stiffener is coupled to the structure with the one or more hardened mandrels remaining in place within the stiffener.

11. The method of claim 9, further comprising placing a breathable material over the one or more flexible mandrels, wherein the breathable material is disposed between the one or more flexible mandrels and the vacuum bag.

12. The method of claim 7, wherein creating the one or more hardened mandrels by hardening the one or more flexible mandrels comprises:
inserting a hardening substance either directly into cavities of the one or more flexible mandrels or inserting the hardening substance into a tube inserted in the cavities of the one or more flexible mandrels; and
hardening the hardening substance.

13. The method of claim 12, wherein:
the one or more flexible mandrels are formed from a material that hardens through a heating process; and
creating the one or more hardened mandrels by hardening the one or more flexible mandrels comprises heating the one or more flexible mandrels.

14. A method comprising:
inserting one or more flexible mandrels into a channel of a tool, the tool comprising a three-dimensional contour corresponding to a structure;
securing the one or more flexible mandrels into the channel of the tool;
creating one or more hardened mandrels by hardening the one or more flexible mandrels while the one or more flexible mandrels are secured in the channel of the tool;
wrapping the one or more hardened mandrels at least partially with a material; and
forming the material into a stiffener.

15. The method of claim 14, wherein the stiffener comprises a shape selected from the group consisting of an I-stiffener, J-stiffener, and a blade stiffener.

16. The method of claim 14, further comprising coupling the stiffener to the structure.

17. The method of claim 16, wherein the stiffener is coupled to the structure with the one or more hardened mandrels remaining in place within the stiffener.

18. The method of claim 14, wherein creating, the one or more hardened mandrels by hardening the one or more flexible mandrels comprises:
inserting a hardening substance either directly into cavities of the one or more flexible mandrels or inserting the hardening substance into a tube inserted in the cavities of the one or more flexible mandrels; and
hardening the hardening substance.

19. The method of claim 14, wherein:
the one or more flexible mandrels are formed from a material that hardens through a heating process; and
creating the one or more hardened mandrels by hardening the one or more flexible mandrels comprises heating the one or more flexible mandrels.

20. The method of claim 14, wherein securing the one or more flexible mandrels into the channel of the tool comprises:
utilizing vacuum pressure to secure the one or more flexible mandrels into the channel of the tool; or
coupling the one or more flexible mandrels into the channel of the tool using an adhesive.

* * * * *